US00RE36455E

United States Patent [19]

Loebner

[11] E Patent Number: Re. 36,455

[45] Reissued Date of Patent: Dec. 21, 1999

[54] BRIGHTPEN/PAD II

[76] Inventor: Hugh Loebner, c/o Brown Industries, 155 N. Park St., East Orange, N.J. 07017

[21] Appl. No.: 07/838,023

[22] Filed: Feb. 20, 1992

Related U.S. Patent Documents

Reissue of:

[64] Patent No.: 5,073,770
Issued: Dec. 17, 1991
Appl. No.: 08/563,096
Filed: Aug. 3, 1990

U.S. Applications:

[63] Continuation-in-part of application No. 07/046,722, May 7, 1987, Pat. No. 4,949,079, which is a continuation-in-part of application No. 06/725,126, Apr. 19, 1985, abandoned.

[51] Int. Cl.[6] ..... G09G 5/00

[52] U.S. Cl. ..... 345/156; 345/157; 345/158; 382/313

[58] Field of Search ..... 340/706, 707, 340/709, 815.31; 358/482, 483, 484; 382/58, 68, 313; 250/227.2, 227.28; 385/121; 345/156–158

[56] References Cited

U.S. PATENT DOCUMENTS

| | | |
|---|---|---|
| 3,337,860 | 8/1967 | O'Hara Jr. . |
| 3,539,995 | 11/1970 | Brandt . |
| 3,613,066 | 10/1971 | Cooreman . |
| 3,618,029 | 11/1971 | Graven . |
| 3,673,579 | 6/1972 | Graven . |
| 3,786,181 | 1/1974 | Pear, Jr. . |
| 4,078,151 | 3/1978 | McNeary . |
| 4,205,304 | 5/1980 | Moore . |
| 4,292,621 | 9/1981 | Fuller . |
| 4,430,526 | 2/1984 | Brown et al. . |
| 4,464,652 | 8/1984 | Lapson et al. . |
| 4,517,559 | 5/1985 | Deitch et al. . |
| 4,550,250 | 10/1985 | Mueller et al. . |
| 4,553,842 | 11/1985 | Griffin . |
| 4,688,933 | 8/1987 | Lapeyre . |
| 4,704,698 | 11/1987 | Reiniger . |
| 4,707,109 | 11/1987 | Kanne et al. . |
| 4,743,974 | 5/1988 | Lockwood . |
| 4,788,587 | 11/1988 | Bitoh . |
| 4,816,921 | 3/1989 | Akiyama et al. . |
| 4,949,079 | 8/1990 | Loebner . |

FOREIGN PATENT DOCUMENTS

| | | |
|---|---|---|
| 0121840 | 10/1984 | European Pat. Off. . |
| 0057856 | 4/1983 | Japan . |
| 0039232 | 3/1985 | Japan . |
| 0138628 | 7/1985 | Japan . |
| 2124054 | 2/1984 | United Kingdom . |

OTHER PUBLICATIONS

"Input for Computer Graphics Display", by A. Spiridon, Western Electric Technical Digest , No. 22, Apr. 1971 p. 39.

"Image Transducer for a Typewriter", by J. C. Edwards, IBM Technical Disclosure Bulletin, vol. 23 No. 7B, Dec. 1980.

*Primary Examiner*—Richard A. Hjerpe

[57] ABSTRACT

[A scanning and digitizing device where the same photodetectors are used in a scanning mode and in a digitizing mode. In the scanning mode graphic information is scanned. In the digitizing mode coordinate positions of a stylus is determined. The photodetectors are used in the imaging portion of this device which imaging portion is a rangefinder in the digitizing mode.]

*A combination scanning and digitizing device is described in which the same photodetectors are cooperatively used to scan graphic information on paper or other planar material and also to determine the position of a stylus. Stylus position detection is by means of a rangefinder.*

9 Claims, 3 Drawing Sheets

BRIGHTPEN/PAD II

Matter enclosed in heavy brackets [ ] appears in the original patent but forms no part of this reissue specification; matter printed in italics indicates the additions made by reissue.

This is a continuation in part of application Ser. No. 07/046,722 filed 5/7/87, now U.S. Pat. No. 4,949,079 patented on 8/14/90, which is a continuation in part of application Ser. No. 06/725,126, filed on 4/19/85, now abandoned.

BACKGROUND OF THE INVENTION

The present invention relates to the device taught in [application Ser. No. 07/046,722] *U.S. Pat. No. 4,949,079,* which is capable of both inputting X, Y, coordinates of a [light emitting or absorbing] stylus into a computer and scanning or digitizing graphic information on a planar surface [such as paper]. As in [application Ser. No. 07/046, 722] *U.S. Pat. No. 4,949,079* the design is such that one or more photodetectors used to determine the Cartesian coordinates of the stylus are capable of digitizing graphic information contained on [sheet material such as paper.] *planar material. This invention differs from U.S. Pat. No. 4,949,079 by claiming that a rangefinder may be used to determine the position of the stylus. This invention is significantly different from that taught by Brown et al, U.S. Pat. No. 4,430,526. The rangefinder used here to determine the position of a stylus eliminates the need for the vertical orientation of the video camera apparatus 125 as described by Brown et al.*

SUMMARY OF THE PRESENT INVENTION

It is the principal object of the present invention to provide an apparatus to improve current techniques for entering X and Y coordinate information and graphic material into computers and like systems. The major advantage of the invention is its ability to *cooperatively* utilize the photodetectors used for the digitization of the X and Y coordinate data *by means of the use of a rangefinder* to also digitize graphic information that may be on [paper or the like] *planar material.*

The apparatus comprises (A) a *first* planar surface such as a CRT or LCD screen having [portions] *positions* thereon identifiable by an X and Y coordinate system, (B) a stylus[, either light emitting or light absorbing,] which indicates the desired X, Y coordinate on the said planar surface, (C) one or more photo detectors capable of resolving images such as CCD's, vidicons, or arrays of photo-transducers, (D) *rangefinding* means for forming images produced by said [styli] *stylus* on the said photodetectors, (E) [means to transport paper or the like for the purpose of scanning graphic information thereon,] *second planar surface containing graphic material to be scanned for input into the computer, and* (F) means to image [material from] said graphic material contained on said *second* planar surface onto the said detectors, and (G) means for converting the output of the photodetectors into input suitable for use by the computer or the like.

BRIEF DESCRIPTION OF THE DRAWINGS

Other features and advantages of the graphic apparatus will become apparent from the following specifications, claims and appended drawings in which:

DESCRIPTION OF THE PREFERRED EMBODIMENTS OF THE INVENTION

The present invention as explained hereafter, uses one or more photodetectors to determine the position of a [light emitting] stylus[, or alternately, a light absorbing stylus such as a finger]. The position is converted into [binary coded electronic] signals suitable for transmission to a computer or other apparatus. The configuration of the photodetectors is such that the detectors used to determine the position of the stylus can also be used to digitize graphic information contained on a [sheet of paper or like] surface. Alternately, the invention can be considered a device to digitize graphic information on [sheets of paper] *planar material* that is also capable of determining the coordinate position of [light emitting or absorbing styli] *a stylus*. [It should be noted that this invention is related to the one in application Ser. No. 07/046,722, and that the electronic components to be incorporated in this invention are identical to those shown in that invention.]

Figure 1:
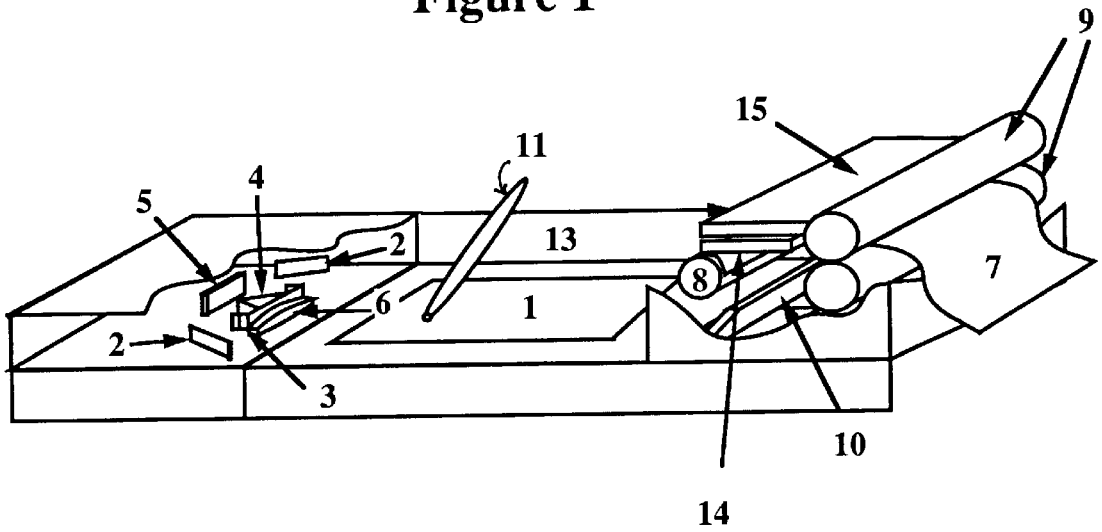
FIG. 1 is a perspective view of the embodiment of the invention.

FIG. 1 shows the preferred embodiment of the device. A stylus 11 is capable of moving over a *first* planar surface on which it is desired to indicate X, Y coordinates. The *said first* surface 1 may be the video output of a computer such a LCD, CRT, plasma, or other output device although this is not necessary. Surrounding the *said first* flat surface 1 are light emitters 13. Also shown in FIG. 1 is a *planar surface, here a* sheet of paper 7 being moved by rollers 9 between guides 14 and 15. The paper 7 is being illuminated by lamp 8. FIG. 1 shows the simultaneous use of a stylus to indicate position, and a piece of paper on which graphic information is to be scanned. It should be understood that in normal operation, one but not both would be present. FIG. [19] *1* shows both only to convey an understanding of the relative locations of the paper, stylus, etc., in the preferred embodiment.

Figure 2A:
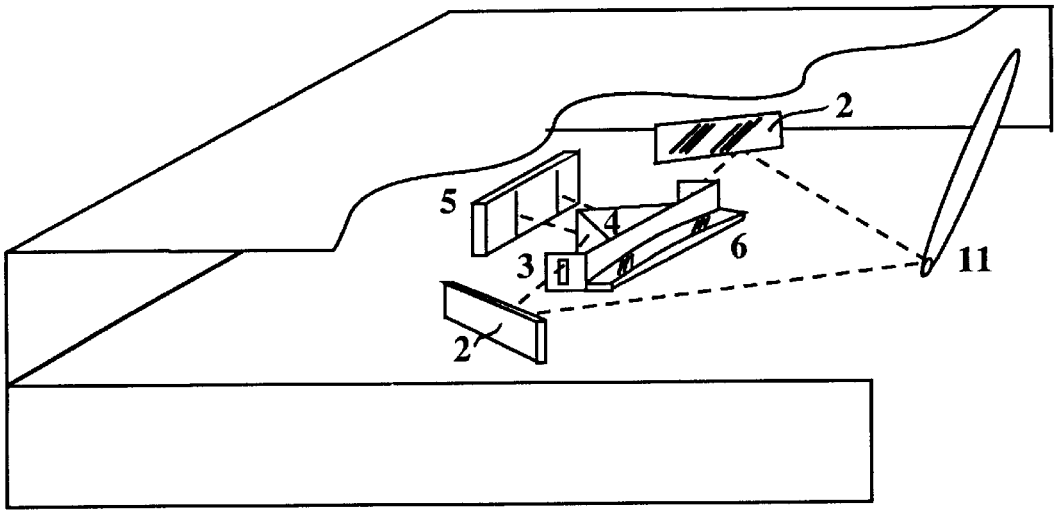
FIGS. 2A and 2B are enlarged perspective views part of the invention showing alternative imaging systems imaging a stylus in FIG. 2A and graphic information in FIG. 2B.
Figure 2B:
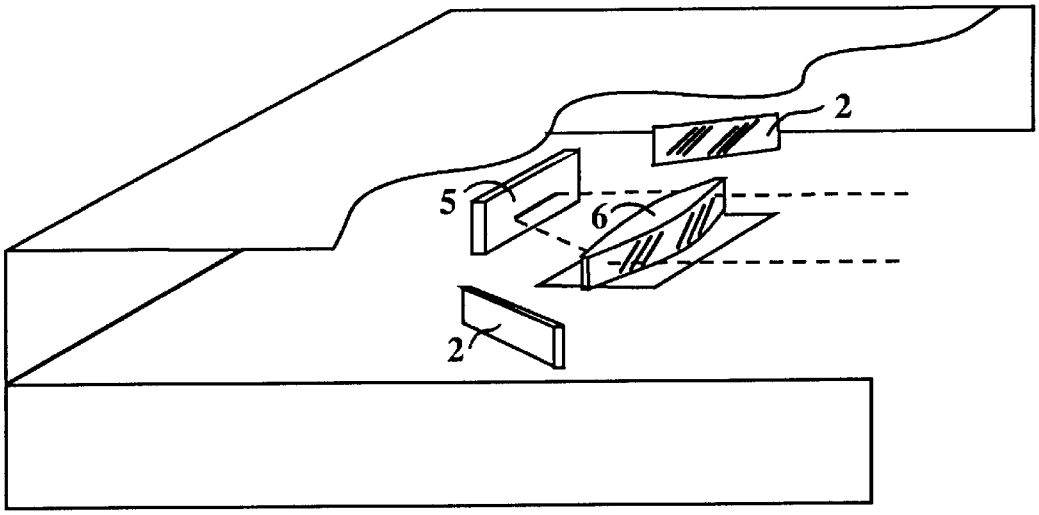

FIGS. 2A and 2B show more clearly how the same photodetector 5 can be used to both determine the position of a stylus and to scan graphic information. FIG. 2A shows a light emitting stylus 11. Light from the stylus, shown here as a dash, strikes first mirrors 2 and thence passes through imaging systems 3, slits or pinholes and is reflected off second mirrors 4 to land upon photodetector 5. The two images of the stylus are represented by vertical solid lines on the photodetector. Persons versed in the art will recognize that this imaging system is in fact a [range finder] *rangefinder*. In the common use of a rangefinder, the distance of the object is determined by rotating the front mirrors until the [2] *two* images become superimposed. In the preferred embodiment of this invention, the distance is determined by elementary trigonometry or table lookup by the separation between the images. However, it would be possible to place first mirrors 2 upon a pivot and use means such stepper motors or piezoelectric linear actuators to rotate said first mirrors under control of the computer until a single image is formed.

In a like manner, the lateral position of the stylus is determined by well [know] *known* trigonometric formulae, although a table lookup can be used if speed is essential. The distance and lateral position of the stylus indicate the X, Y coordinates. It should be noted that the imaging system in FIG. 2A is a slit (or alternatively a [pine] *pin* hole) since the depth of field for these are essentially infinite. Lenses may be used if they have a sufficient depth of field, since all that is needed is the centroid of the images. Also, although a light emitting stylus is shown in FIG. 2A, a light absorbing stylus can be used. In this case, the image formed on the photodetector will be the shadow cast by the stylus formed by its interposition [of the stylus] between light emitters (not shown in this figure) and the photodetector 5 via the optical path front mirrors 2, slits 3 and second mirrors 4.

First mirrors 2 are shown as optically flat in this and other figures. It may desirable to make them convex so that they minify the view of the field 1.

FIG. 2B shows the imaging system for scanning graphic information. Here, the slit 3 and the second mirrors 4 have rotated down beneath the field, and lens 6 has swung into position. Light from the sheet of paper is focused by lens 6 [is focused] on photodetector 5.

Figure 3A:
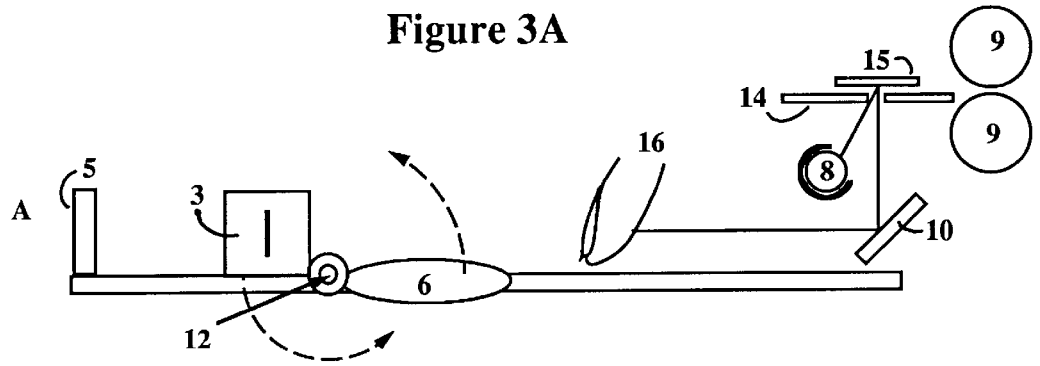
FIGS. 3A are 3B are fragmentary side elevations of the invention showing how the imaging systems may be alternated.
Figure 3B:
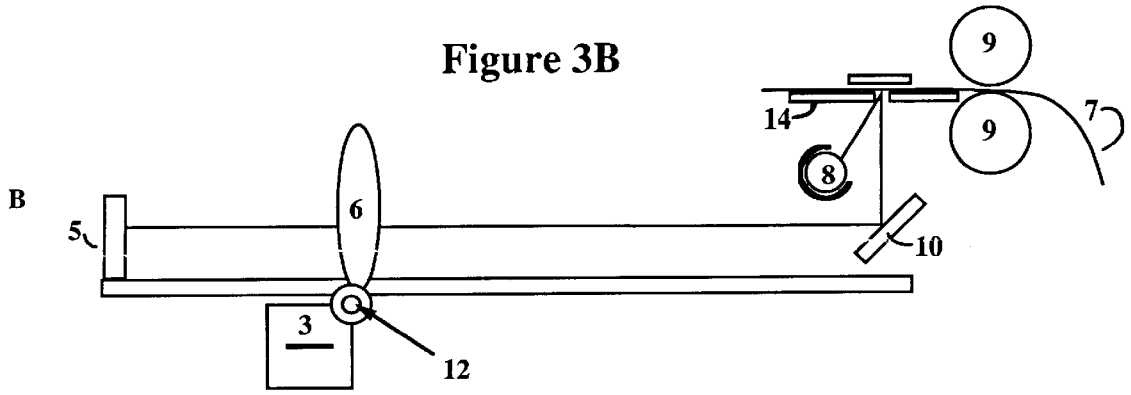

FIGS. 3A and 3B show more clearly how the elements described are situated and operate. In FIG. 3A a finger 16 represents a light absorbing stylus. Lamp 8 is on, illuminating paper guides 14 and 15, which are typically to be white, and hence reflective. Light is reflected from the guides 14 and 15 onto mirror 10 and thence toward mirrors 2 (not shown). [Sail] *Said* light is intercepted by finger 16. [If] *It* should be understood that for the apparatus to work with a light absorbing stylus, illumination must be present on three sides of the field 1. In [patent application 07/046,722] *U.S. Pat. No. 4,949,079,* this was achieved in the preferred embodiment by the presence *of* lamps on three sides. Here, the paper guides in conjunction with the lamp 8 used for scanning and the mirror 10 used for scanning, can perform this function for one side. It is also possible, of course, to use a third, retractable, lamp if so desired. FIGS. 3A and 3B show how the lens 6 and the mirrors 4 (not shown) and optical slits 3 can rotate around pivot 12. In FIG. 3B the lens 6 is in a position to image one line of graphic material found on paper 7. Paper[,] 7, is illuminated by lamp 8, while being transported by rollers 9. Practitioners versed in the art will understand that as the rollers 9 transport paper 7 laterally, successive rows of pixels on said paper 7 will be digitized. As in [patent application Ser. No. 07/046,722] *U.S. Pat. No 4,949,079,* the rollers can be rotated by stepper motors under *the* control of the computer, or manually by the user. If the latter system is used, timing tracks on the rollers will suffice to indicate relative motion of the paper. Both techniques are well known to practitioners in the art.

The rotation of the lens 6 and mirrors 4 around pivot 12 can be effected by the computer via control of a stepper motor, or they can be rotated manually by the user.

Although the preferred embodiment shown here has the lens 6 and mirrors 4 located at substantially the same distance from the photodetectors 5 this is not necessary for proper operation of the apparatus. All that is necessary is means to provide alternative optical paths to the photodetector 5 depending on the desired mode of the apparatus.

*The photodetectors 5 shown in this disclosure are well known to practitioners in the art and are readily available as components of scanners and facsimile devices. They incorporate the appropriate circuitry (typically analog to digital circuits) to prepare a signal suitable for input into computers and the like. This application teaches that any such photo responsive component capable of resolving an image and of generating a signal which can be input into a computer can be used for the dual purpose of scanning graphic material on planar surfaces and also to determine the position of a stylus. All that is needed is appropriate methods of imaging both on the said photo responsive signal generator.*

I claim:

1. An apparatus for digitizing graphic information on [sheets of paper] *planar material* comprising photodetectors [and] *in an* imaging system[s] capable of imaging graphic information on said [sheets of paper] *planar material*, and which said photodetectors are [also] *cooperatively* used to digitize the coordinate position of a [light emitting stylus or light absorbing] stylus by *rangefinding* means [of converting analog signals from said photodetectors to digital] *for imaging said stylus on said photodetectors and means for generating* signals *from said photodetectors* suitable for input into a computer or the like.

2. An apparatus according to claim 1 in which [said photodetectors are capable of digitizing the coordinate position of the stylus by means of systems capable of forming images of the stylus on the said photodetectors and] the means of imaging graphic information on said sheets of [paper] *planar material* is by means [of] *for* imaging successive lines of information on said [sheets of paper] *planar material* [by means of transporting said sheets of paper].

[3. An apparatus according to claim 2 in which the means for forming said images of stylus indicating X, Y, coordinate position of said stylus consists of a rangefinder.]

4. An apparatus according to claim [3] *1* [consists of] *in which said rangefinding means for imaging said stylus on said photodetectors comprises* means for acquiring separate views of said stylus, means for forming images of said separate views, and means for projecting said images upon said photodetectors.

5. An apparatus according to claim 4 in which means for acquiring separate views consists of mirrors.

6. An apparatus according to claim 4 in which means for forming said images are slits.

7. An apparatus according to claim 4 in which means for forming said images are pinholes.

8. An apparatus according to claim 1 in which the photodetector consists of a CCD detector array.

9. An apparatus according to claim 1 in which the photodetector consists of a vidicon tube.

10. An apparatus according to claim 1 in which the photodetector consists of an array of photoelectric cells.

* * * * *